United States Patent

[11] 3,526,212

| [72] | Inventors | Jacques Bassot<br>Paris, France;<br>Louis Monpetit, Etang-la-Ville, France |
|---|---|---|
| [21] | Appl. No. | 695,281 |
| [22] | Filed | Jan. 2, 1968 |
| [45] | Patented | Sept. 1, 1970 |
| [73] | Assignee | Societe des Procedes Modernes d'Injection Sopomi<br>Les Mureaux, Yvelines, France |

[54] ELECTRONIC CONTROL SYSTEM FOR CONTROLLING THE DIRECT OR INDIRECT FUEL INJECTION IN MOTORS AS A FUNCTION OF MOTOR SPEED
25 Claims, 18 Drawing Figs.

[52] U.S. Cl. .................................................... 123/32,
123/119, 123/140
[51] Int. Cl. .................................................... F02d 5/02
[50] Field of Search ........................................... 123/32.E-1,
119; 307/232, 265, 283, 301; 323/58, 22T;
317/21, 5; 328/190

[56] References Cited
UNITED STATES PATENTS

| 2,884,916 | 5/1959 | Winkler .................... | 123/119 |
| 2,941,519 | 6/1960 | Zechnall et al. ........... | 123/32 |
| 2,992,640 | 7/1961 | Knapp ...................... | 123/119 |
| 3,051,152 | 8/1962 | Paule et al. ............... | 123/32.E-1. |
| 3,223,909 | 12/1965 | Sensing et al. ............ | 307/265X |

*Primary Examiner*—Laurence M. Goodridge
*Attorney*—Kenyon, Kenyon, Reilly, Carr and Chapin

ABSTRACT: The pulses which control the fuel injection by injectors in a motor are used to generate a voltage which varies as a function of motor speed by means of a circuit which consists of a pulse transformer, rectifiers and a resistor-capacitor connected across said rectifier, the voltage across said capacitor thus varying as a function of motor speed. The injection is stopped when the emitter voltage and voltage at the bases of a unijunction transistor reach a predetermined relationship. Thus circuits are shown for varying the charging current of a capacitor in the emitter circuit as a function of motor speed voltage and/or for varying the voltage at base of the unijunction transistor.

Patented Sept. 1, 1970

INVENTORS:
Jacques Bassot
Louis Monpetit
By Michael S. Striker
Attorney

Patented Sept. 1, 1970

INVENTORS
Jacques Basset
Louis Monpetit
By Michael S. Striker
Attorney

ELECTRONIC CONTROL SYSTEM FOR CONTROLLING THE DIRECT OR INDIRECT FUEL INJECTION IN MOTORS AS A FUNCTION OF MOTOR SPEED

BACKGROUND OF THE INVENTION

The present invention relates to electronic systems for controlling the direct or indirect fuel injection in spark ignition engines.

Electronic arrangements are known wherein a bistable element is used to control the beginning and end of each injection. In these the bistable element is put into the "conducting-conducting" state by an injection start signal which is synchronized with the rotation of the motor and it is put into the blocked condition by an injection stop signal furnished by a variable delay device. The latter consists of an arrangement comprising at least one transistor which may be of the unijunction type, and a condenser. In this known arrangements, a signal is furnished simultaneously by means of a distributor, to the gate of a control thyristor provided for the particular electromagnetic injector to be controlled, and to the bistable element in order to switch it to the conducting condition. Thus the energizing current which results in the opening of the injector and which is furnished by a power transistor controlled by the bistable element can flow to said injector. The total injection time is a function of the particular operating conditions of the motor. In these known arrangements the charging time of either a variable or a fixed condenser in the variable delay device is used to control the switch-over to the blocked state of said bistable element, thus controlling the end of the injection. The condenser is then charged from the bistable element from the moment that the bistable element is switched to the conducting position via, for example, a variable resistance. At the end of a certain time the condenser reaches a certain potential, for example, a potential in relation to the potential applied to the positive base of a unijunction transistor, and said condenser discharges rapidly across said unijunction transistor, thus producing a signal which causes the bistable element to be reset into the blocked position, thus stopping the injection. The time of injection is thus a function of the magnitude of the charging current of said condenser, of the capacity of said condenser, and of the potential applied to the base of the unijunction transistor which is a part of the variable delay device. A number of arrangements are already known which cause variation of all or part of the three parameters in order to obtain the desired regulation of the motor. These consist of a variable resistance in the charging circuit of said condenser, or in voltage dividers, thermal sensitive elements, etc... which are present in the positive base circuit of said unijunction transistor to cause a variation of the voltage applied to said base. These known arrangements do not allow a variation of the injection parameters as a function of the speed of the motor, nor do they allow an individual and independent regulation of the injectors of a polycylindric motor by means of a single control arrangement.

SUMMARY OF THE INVENTION

This invention is a system for use in conjunction with a variable delay device which is adapted to control the fuel injection time of at least one injector in a motor by generating an injection stop signal at an injection time period after the start of said fuel injection. It comprises a system for varying said injection time period as a function of motor speed. This system consists of means for generating a speed voltage as a function of motor speed, said means being completely static means. It further comprises means for applying said speed voltage to said variable delay device in such a manner that said injection time period is varied as a function of said speed voltage and thus of said motor speed. In particular, the system is used in conjunction with an electronic control system for a motor which has a bistable electronic element which is controlled by an injection start signal which is a function of the angular position of a shaft of the motor and by an injection stop signal which is generated by said variable delay circuit. The latter consists of at least one transistor adapted to change state when the voltage at a first and second transistor terminal reaches a predetermined relationship, and a capacitor connected to said first terminal. Said change of state generates the signal which causes the bistable element to be switched to its "blocked-blocked" condition which causes the end of the injection period. The system according to this invention thus consists of circuitry which controls the injection time period for which this variable delay device operates as a function of motor speed. Thus a voltage which is a function of motor speed may be furnished to the charging circuit of said capacitor in such a manner that the charging current of said capacitor is modified as a function of motor speed, or it is possible to control the voltage at the second terminal of the transistor of the variable delay device by said speed voltage in such a manner that the voltage at said second terminal is a predetermined function of the speed of rotation of the motor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Reference to the figures will show that the injection systems to which the present application is related make use of electromagnetic injectors or electromagnetic transducers in general which function in such a manner that the quantity injected varies linearly with the time during which the injectors or transducers are electrically activated. Thus the injection begins from the moment said injectors are energized. The electronic commutation which allows successive energization of the various injectors, for the case of a polycylindric motor, is not shown and has been described previously.

Figure 1:
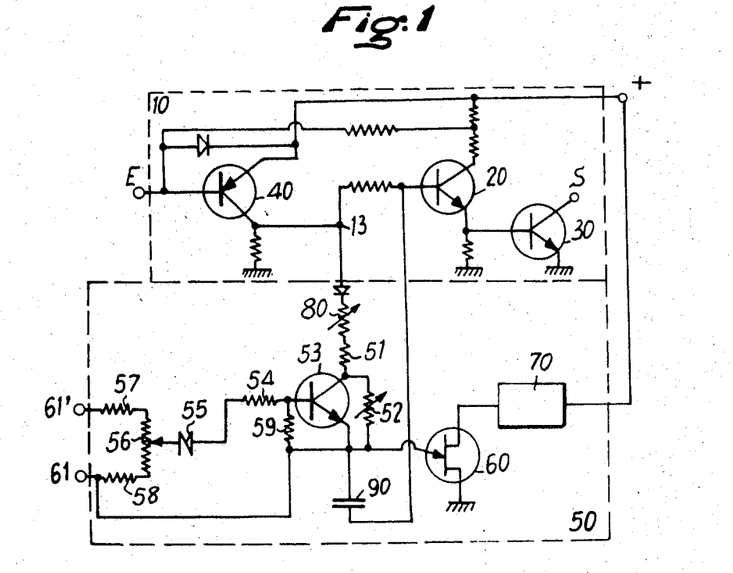
FIG. 1 is a circuit diagram showing the combination of a bistable element and a variable delay device having a unijunction transistor equipped with a device controlled by the speed of rotation of the motor according to this invention.

FIG. 1 shows a control arrangement consisting of a bistable element, numbered 10, and a variable delay device with associated circuitry, numbered 50. The bistable element 10 essentially consists of two transistors 40 and 20 which here are shown to be NPN and PNP transistors respectively, although other arrangements may be used. The transistor 20 is usually connected to a power transistor 30 and forms a "Darlington" connection in conjunction with it. The injectors are activated by means of an electronic distribution system at the point marked S. This system is not shown.

The injection timing system, which is hereafter called the variable delay device is an arrangement consisting of at least one transistor. Its essential elements include a variable resistance 80, a condenser 90, and a unijunction transistor 60. A subassembly 70 permits the incorporation of certain motor parameters. The operation of the circuit may be briefly summarized as follows: At the beginning of the injection, a device which is not shown causes a negative pulse to be applied to the input of the bistable element at the point marked E and further simultaneously assures the commutation to the chosen injector from point S. The pulse applied at point E assures that the bistable element 10 is switched to the conducting state, from the blocked condition. Since transistor 40 becomes so highly conductive as to be saturated, the collector is raised to substantially the same potential as the positive terminal of the power supply, thus causing condenser 90 to charge according to an RC time constant determined by variable resistance 80 and the base-emitter junction of transistor 20.

Thus, the emitter potential of the unijunction transistor 60 rises progressively. When this voltage attains a certain value based on the characteristic of unijunction transistor 60 and the voltage applied to the positive base of this element, the negative emitter-base junction of unijunction transistor 60 suddenly becomes conductive. Thus the base of transistor 20 receives a negative pulse which causes the bistable element to switch to its original state and thus cause the end of the injection.

Regulation is accomplished by means of variation of resistance 80, or by a variable capacitive arrangement, and also by means of arrangement 70.

First means for applying a voltage which is a function of motor speed (speed voltage) to the above described variable delay means, comprise means for varying the charging current of capacitor 90 as a function of speed.

These means consist of transistor 53 whose collector-emitter circuit is connected in parallel to resistance 52 and whose base is connected to its emitter and to point 61 via a resistance 59. A voltage which is a function of the speed of rotation of the motor is applied between this point 61 and the point 61'. For this description it will be assumed that this voltage is an increasing function of speed, and that this voltage is applied with such a polarity that the voltage at point 61' exceeds the voltage at point 61 and that the difference $V_{61'} - V_{61}$ increases with increasing speed.

This voltage is applied to a voltage divider consisting of resistances 57 and 58 and potentiometer 56. The variable arm of this potentiometer is connected to the base of transistor 53 by means of a Zener diode 55 and a resistance 54. The circuit is here shown with the Zener diode, but the device according to this invention also includes the case where the Zener diode is not present and where the voltage is supplied to the base of transistor 53 either directly from the variable arm of potentiometer 56 or by means of resistance 54 only.

The operation is as follows:

At low rotary speed, for a given position of the variable arm of potentiometer 56, transistor 53 is non-conducting if the voltage between the variable arm of potentiometer 56 and the point 61 is lower than the Zener voltage of diode 55, or otherwise, the transistor 53 is only slightly conducting if the Zener diode 55 is not in the circuit.

Thus the duration of injection corresponds to the charging time of condenser 90 by means of the circuit 80—51—52.

However, the base current of transistor 53 increases with increasing speed, causing the transistor to become more conductive if there is no Zener diode present. If this diode is present, it will break down for a determined value of speed and transistor 53 will become conductive at a certain threshold velocity.

In any case, the charging circuit of condenser 90 sees a decreasing resistance and therefore the injection time decreases in direct proportion to the increase of speed until transistor 53 becomes saturated.

If the variable arm of potentiometer 56 is displaced upwards, the threshold velocity decreases, and/or the same conductance of transistor 53 is obtained at a lower velocity. Inversely if the variable arm of the potentiometer is set further down, the same conductances are obtained for higher speeds.

Generally speaking it may be said that if a voltage which increases with speed is used, an automatic diminuation of the basic injection time will result from the application of said voltage, or a fraction of said voltage, to the base of a transistor connected in the charging circuit of a condenser which is in a variable delay device which comprises at least one transistor.

The beginning of automatic control may be adjusted towards either higher or lower velocities by a simple displacement of the variable arm of the potentiometer.

By inserting a Zener diode into the circuit connecting the base of said transistor to said voltage divider no diminuation of injection takes place until a certain speed is attained.

In this case, too, the threshold of velocity control is attained by simple movement of the variable arm of a potentiometer.

Furthermore, by adjustment of resistance 52, or by inserting a resistance which is not shown, in series with the collector-emitter circuit of transistor 53 one may cause any desired variation in the relationship between the maximum and the minimum resistance of the circuit comprising resistance 52 in parallel with transistor 53, in such a manner that one can regulate the threshold of the reductions of the injection at will by simple adjustment of the resistance value of either a fixed or variable resistance, or of two fixed or variable resistances.

It should be understood that use of an NPN transistor here is given as an example only and that the circuit need not be limited to this type of transistor. A circuit with a PNP transistor leads to an obvious simple modification of the connection. It is furthermore clear that it is possible to obtain a progressive increase in injection, as opposed to the previous decrease in injection, with increasing speed from a speed voltage. This increase in injection with increasing speed may of course also have a threshold below which no regulation takes place. It is also clear that by appropriate circuits, the same results may be obtained with voltages which decrease with increasing speed.

Figure 2:
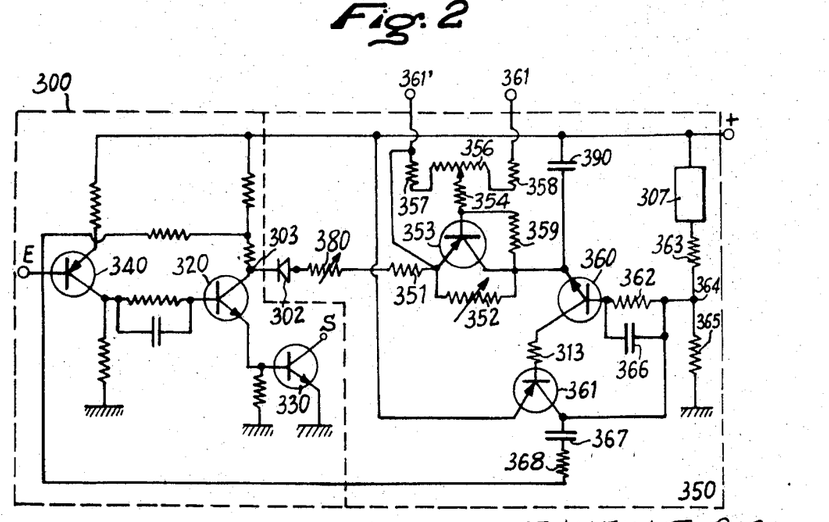
FIG. 2 is another embodiment of FIG. 1, wherein the variable delay device comprises two transistors.

As an example, FIG. 2 shows a variation utilizing a PNP transistor. In this circuit a progressive increase in injection is obtained without threshold effects for a decreasing voltage applied between terminals 361 and 361'. A variable delay device having two transistors is shown. In this figure the circuitry marked 300 consists essentially of transistors 340 and 320 connected in a Darlington arrangement with transistor 330. This is essentially the bistable element shown in FIG. 1. The variable delay device has a slightly different embodiment. Two complementary transistors 360 and 361 are present. The former is of the NPN type and has an emitter connected to the positive terminal of the power supply by means of a condenser 390 and connected to the collector of transistor 320 by means of resistance 351, the variable resistance 380, and the diode 302. Its base is connected to the voltage divider point 364 of a voltage divider consisting of resistors 365 and 363 and a device 307 for inputs which are a function of the motor parameters by means of a resistance 362 connected in parallel with condenser 366. The collector of transistor 360 is connected to the base of transistor 361 by means of resistance 313. The emitter of said transistor 361 is connected to the positive terminal of the power supply.

Finally the collector of transistor 361 is connected on the one hand to point 364 of the voltage divider, and on the other hand to the base of input transistor 340 of the bistable element via the resistance 368 and the condenser 367. The variation of charging time is obtained by the circuit comprising transistor 353, having a variable resistance 352 in parallel with its emitter-collector circuit. Resistance 359 connects the collector to the base of said transistor 353, while a resistance 354 connects said base to the variable arm of a voltage divider comprising resistances 357 and 358 and potentiometer 356. Voltage which decreases with motor speed is applied between terminals 361' and 361. The common point of resistances 351 and 352 is connected to point 361' as is the emitter of transistor 353. The common point of the collector of transistor 353 with resistances 352 and 359 is connected to the transistor 360 and to capacitor 390 of the variable delay device.

The circuit operation is as follows:

When the bistable element 300 is in the blocked state, no injection takes place and the voltage at the emitter of transistor 360 is equal to the supply voltage. When a pulse is applied to input E of the bistable element, this is switched to the "conducting-conducting" state and thus causes the beginning of the injection. The voltage at the collector of transistor 320 changes to substantially zero voltage and capacitor 390 charges via elements 351, 380, 302, 320, 340 and 352. The emitter potential of transistor 360 progressively lowers while the base stays at the potential of point 364.

When the emitter of transistor 360 reaches a sufficiently low value, transistor 360 becomes conducting, the voltage at the base of transistor 361 is lowered and point 364 is connected by way of the emitter-collector circuit of transistor 361 to the positive terminal of the power supply. Consequently the voltage at the base of transistor 360 reaches a high value and causes the rapid discharge of condenser 390 by the circuit consisting of elements 360, 361, 313, and 390. At the same time the circuit consisting of capacitor 367 and 368 transmits a positive pulse to the base of transistor 340, thus assuring the switching of the bistable element to the "blocked-blocked" state. The time determined by the variable delay device is substantially equal to:

$$t = (R_{380} + R_{351})C_{390} \log \frac{E}{E - V_{364}}$$

where E designates the supply voltage.

It may be seen that this device, which assures an excellent voltage control of the bistable element, allows the regulation of $t$ by means of regulation of the resistance and capacitance values and further by regulation of $V_{364}$, which explains the presence of device 307 for introducing various motor operating parameters.

The slow current commutation which results from use of a conventional monostable element does not exist here. Under voltage control of transistors 340 and 320 the switching time is extremely short. Also an excellent temperature stability results.

The switching of transistors 360 and 361 is caused by an "avalanche" phenomenon which is similar to that in a unijunction transistor. Furthermore, the large numbers of high impedance inputs is convenient. The voltage stability is excellent, since it depends only on the voltage relationship between passive, stable elements.

Figure 3:
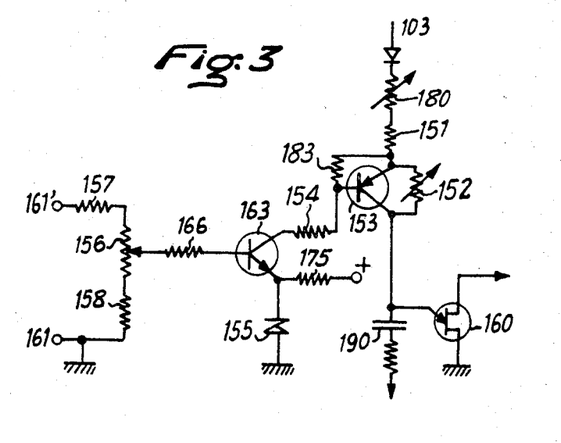
FIG. 3 is another embodiment of a variable delay device controlled by the speed of rotation.

FIG. 3 shows another embodiment of a device according to this invention. It differs from the preceding embodiment by use of two transistors for controlling the charging current. Elements which correspond to elements shown in FIG. 1 are designated by the same numbers, with an additional prefix digit 1. The transistor 153, which in this case is a PNP transistor has its emitter-collector circuit connected in parallel with resistance 152 of the charging circuit of condenser 190. The base of this transistor is connected to the collector of a transistor 163, here as an example an NPN type, by means of a resistance 154. The emitter of transistor 163 is maintained at a given potential by Zener diode 155 which is connected to the positive supply terminal by means of resistance 175.

The base of transistor 163 is connected to the variable arm of potentiometer 156 by means of a resistance 166. The potentiometer 156 is in a voltage divider circuit formed by resistances 157 and 158 and potentiometer 156. A voltage which is a function of motor speed is applied between terminals 161 and 161'. In order to explain the operation, it is assumed that this voltage increases with speed. This is not to be considered a limitation.

For a given position of the variable arm of potentiometer 156, and for low speeds, the voltage at this variable arm and thus the voltage at the base of transistor 163 is lower than the emitter voltage of this transistor. The transistor is thus nonconducting. Since the base of transistor 153 is connected to its emitter potential by high resistance resistor 183, transistor 163 does not conduct either. It follows that the injection time corresponds to the charging time of capacitor 190 via elements 180, 151 and 152. As the speed increases, the voltage at the base of transistor 163 increases. When this voltage attains a value which is slightly higher than the voltage of the Zener diode 155, the transistor becomes conductive, as does transistor 153, and condenser 190 charges more rapidly, which causes a diminution of the injection.

Of course a continuous regulation without threshhold may be obtained by omitting Zener diode 155 and resistor 175. The emitter of transistor 163 is then connected to the negative power supply terminal. This arrangement is particularly well adapted for speed regulation in diesel motors, since it permits a rapid decrease of the injected fuel quantity by use of a lower power voltage source applied between points 160 and 161'. Displacement of the variable arm of potentiometer 156 allows regulation of the threshold speed. For the particular case of speed regulation in a diesel motor the accelerator pedal is simply connected to the variable arm of potentiometer 156, which allows a simple setting of regulating speed.

The arrangements described in connection with FIGS. 1, 2 and 3 all pertain to an automatic modification of the injection as a function of speed by changes in the conductance of the emitter circuit of a unijunction transistor 60 or transistor 360 of the circuitry of FIG. 2.

Circuits which will not be described (FIG. 4) which act by modifying the power supply voltage for the emitter circuit of the unijunction transistor 860 or of transistor 360 of the circuit of FIG. 2. The power supply for the positive base is not shown. Voltage is supplied to the emitter when the bistable element which is also not shown has changed state under the action of an external injection start pulse applied at point 803. The emitter of unijunction transistor 860 is connected first to a terminal of condenser 890 and, secondly, to point 803 via the resistances 880, and 851 and the diode 802. The other terminal of condenser 890 is, as previously, connected to the bistable element which is not shown. A resistance 801 is connected to the common point of resistances 850 and 880. The other terminal of resistance 801 is connected to the collector of a transistor 800 whose emitter is connected to Zener diode 855 and to the positive terminal of the power supply via resistance 875. The other terminal of Zener diode 855 is connected to ground. The emitter potential of transistor 800 is thus fixed. The base of transistor 800 is connected to the variable arm of a potentiometer 856 by means of resistance 804. The potentiometer 856 is part of a voltage divider which is supplied with voltage between points 861' and 861 which may as an example be supposed to be increasing with increasing speed. The assumption of positive polarity of 861' as compared to 861 is also given as an example only. The voltage divider further consists of resistances 857 and 858.

Figure 4:
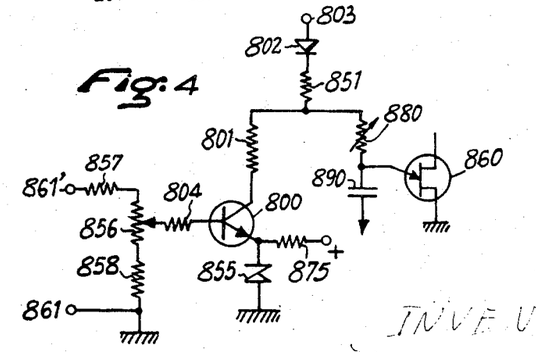
FIG. 4 is a further embodiment of a variable delay device having a delay varying as a function of the speed of rotation of the motor.

Operation of the circuit is as follows:

For a given position of the variable arm 856 below a certain voltage, that is to say below a certain speed, transistor 800 is blocked and condenser 890 is charged from point 803 through the path consisting of diode 802, resistor 851, and resistor 880, thus yielding a certain duration of injection. For a certain threshold speed which depends on the voltage of Zener diode 855 and the position of the variable arm of potentiometer 856, transistor 800 becomes conductive and becomes more and more conductive with increasing speed until it becomes saturated. It thus follows that the voltage at the common point of 851, 801, and 880 drops in proportion to the increase in current in the branch consisting of elements 801, 800 and 805, thus increasing the time necessary for capacitor 890 to charge to the cut-in value of the emitter of unijunction transistor 860 which, in turn causes an increase in the injection time.

An important characteristic of the described circuit is the impedance offered to the voltage source as a function of speed. The energy required from this voltage source is very small since high impedance voltage dividers are used. This allows the use of very simple elements for furnishing the voltage which is a function of speed.

Figure 5:
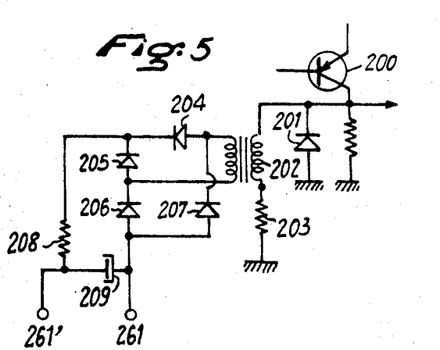
FIG. 5 is a circuit diagram of an arrangement which furnishes a voltage which increases with the speed of rotation.

FIG. 5 shows such a device. It contains a pulse transformer 202 whose primary is connected to the collector of one of the transistors of the bistable element, for example, transistor 200 and whose secondary is applied through a rectifier illustrated here as a bridge consisting of diodes 204, 205, 206 and 207, and a condenser 209 in series with a resistance 208. The voltage which is a function of speed is thus supplied at the terminals of this condenser 261' and 261 which may for example be connected to point 61', 61 of FIG. 1 or 160, 161 of FIG. 2 etc.

The operation of the circuit is as follows: Transistor 200 represents one of the transistors of the bistable element.

The voltage at the collector of this transistor changes at the beginning of the injection as has been said above, from zero to positive supply voltage and changes back to zero at the end of the injection. Thus the primary winding of transformer 202 carries a current during the injection, since this winding is connected in series with the resistance between the collector of transistor 200 and ground. A diode 201 protects transistor 200 against unwanted overvoltages. The current in the primary winding of transformer 202 decreases rapidly at the end of the injection because of the circuit consisting of resistance 203 and diode 201. Thus the secondary winding will deliver two pulses of opposite polarity, one at the beginning of the injection, the other at the end. The diode bridge allows charging of condenser 209 via resistance 208 because of these pulses. It is clear that the diode bridge is given as an example only and that of course it is possible to use only one of the pulses, preferably that corresponding to the beginning of the injection, with a single diode or even two pulses but with only two diodes and a secondary winding which has a center tap.

The circuit 208 and 209 does not generally assure a demodulation of this pulse current, but none of the circuits described herein need such demodulation.

The signals which start and/or end the injection are used to generate the voltage at points 261' and 261. Thus the same phase relationship must therefor of necessity exist between the voltage furnished by the device of FIG. 5 or other similar devices, and the starting of the variable delay device during whose operation the said speed voltage is applied to the speed control circuits described above. Condenser 209 simply assures the existence of a continuous function of speed. For the case of the circuit of FIG. 5 this is an increasing function of speed.

Because of the use of circuits set forth above, the generation of the voltage which is a function of speed does not require any auxiliary source such as a tachometer and furthermore does not require any costly demodulation system. Regulation takes place entirely within the electronic device without need of any signals other than those which start the injection in the various cylinders.

Figure 6:
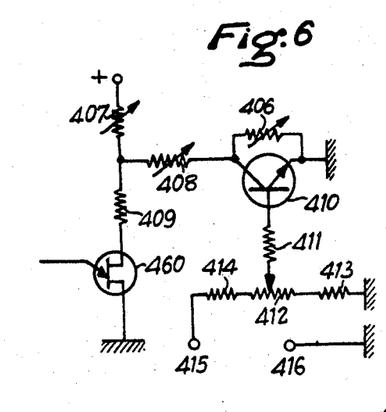
FIG. 6 is a circuit diagram of an arrangement for regulating the voltage applied to the positive base of a unijunction transistor in the variable delay device, according to this invention.

FIG. 6 shows a speed control device for application in circuit block 70 in FIG. 1, for example, or 307 of FIG. 2.

For the description of the operation it will be assumed that the device is combined with a variable delay device having a unijunction transistor, the change to 307 for the device of FIG. 2 being evident. The unijunction transistor for the variable delay device has been numbered 460 in FIG. 6. The positive base of this transistor is supplied with voltage from the positive terminal of the power supply by way of a voltage divider consisting of resistances 407 and 409. A variable resistance 408 is connected to the common point of these resistances, the other terminal of which is connected to the negative terminal of the power supply via a transistor 410 in parallel with a variable resistance 406.

The base of transistor 410 is connected to the variable arm of potentiometer 412 by way of a resistance 411. The potentiometer 412 is part of a voltage divider circuit which also consists of resistances 413 and 414 and is supplied with voltage between terminals 415 and 416. This voltage is a function of speed.

As an example it will be supposed that the voltage applied between points 415 and 416 is an increasing function of motor speed and that the polarity is positive at point 415. Of course as has been set forth before, changes of the function, of the polarity, or of the type of transistor (PNP instead of NPN) allow all sorts of combinations and of control. Although the description of the operation is given only for the case with the above assumptions, it goes without saying that this is not to be taken as a limiting case.

As has been said above in relation to the circuit connected to the emitter circuit of the unijunction transistor and for the same reasons, points 415 and 416 may be easily supplied by a circuit identical or analogous to that which has been described in connection with FIG. 5.

For a given position of the variable arm of the potentiometer 412 and at low speeds, transistor 410 is barely conductive. With increasing speed, the current in the base of transistor 410 increases; the transistor becomes more and more conductive until saturation. Thus the voltage at the common point of resistances 407, 408 and 409 decreases progressively, thus decreasing the potential at the positive base of the unijunction transistor. The duration of the injection decreases, since the variable delay device which contains unijunction transistor 460 furnishes the pulse for resetting the bistable element to the blocked state more rapidly.

By displacing the variable arm of potentiometer 412 one can vary the speed range over which the device acts before saturation of transistor 410. By inserting a Zener diode in series with resistor 411 it is possible to limit the action of the device to a range of speed starting with a minimal threshold.

Varying resistance 406 changes the maximum percentage variation of the injection. The same end may be achieved by varying resistances 407 and/or 408. In FIG. 6 variable resistances were shown for resistances 406, 407 and 408, but in practice fixed resistors would be used whose value is determined as a function of the motor characteristics. Furthermore the device is very well adapted for the control of low motor speeds, in fact so well adapted that potentiometer 412 is generally an adjustable type and is adjusted for the low speed regulation of said motor. For example the combination of resistors 407 and 408 may be replaced by a potentiometer whose variable arm is connected to unijunction transistor 460 via resistance 409, thus constituting a manual control for enriching the mixture when starting up cold.

Figure 7:
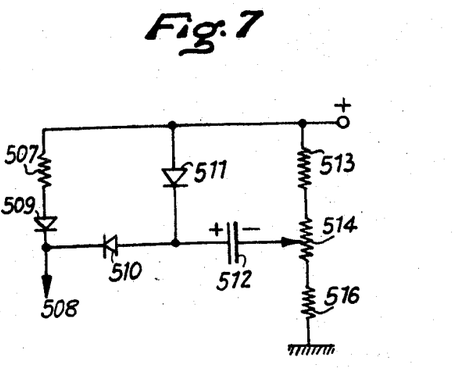
FIG. 7 is a circuit diagram of a first embodiment of a device for transient regulation of the voltage applied to the positive base of a unijunction transistor in the variable delay device.
Figure 8:
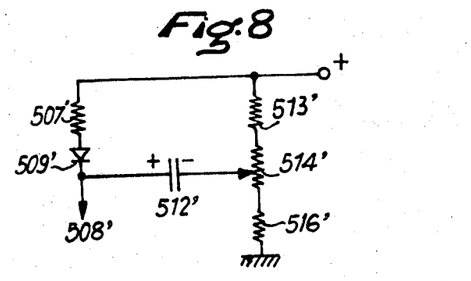
FIG. 8 is a circuit diagram of a second embodiment for transient regulation of the voltage applied to the positive base of a unijunction transistor in the variable delay device.

FIGS. 7 and 8 show two variations of a device for causing momentary over-injection. The device is connected in the positive base circuit of the unijunction transistor or in block 307 or 365 of the variable delay device having two transistors. It may be connected in combination with other devices or by itself. For this description it will be assumed that it is connected by itself into a unijunction transistor circuit. Point 508 of FIG. 7, or 508' of FIG. 8, is connected to the positive base of a unijunction transistor which is not shown by means of a resistance which is also not shown. One terminal of a condenser 512 is connected to the positive power supply terminal via diode 511 and to terminal 508 via diode 510 or only directly to the point 508' as in FIG. 8; while the other terminal is connected to the variable arm of a potentiometer 514 or 514' which forms part of a voltage divider consisting also of resistances 513 and 516, or 513' and 516', which are connected to the power supply terminals. Furthermore point 508 is connected to the positive power supply terminal by means of resistance 507 and diode 509, or by resistance 507' and diode 509' in the case of FIG. 8.

In order to describe the operation of these devices, it is assumed that the motor is operating with a low fuel supply and thus with a small depression of the accelerator. The variable arm of potentiometer 514 or 514' which is connected to the accelerator is at the lower end of the potentiometer as shown in FIGS. 7 and 8. Condenser 512 is thus charged with a polarity shown in the figures. If the accelerator pedal is depressed rapidly, thus rapidly raising the variable arm of the potentiometer 514 upwards, the left terminal of condenser 512 or 512' is temporarily at a higher potential, which causes a rise in voltage at the positive base of the unijunction transistor and therefore causes an increase in the duration of the injection until said condenser is discharged across the base-base circuit of the unijunction transistor. It is possible to omit diodes 509 or 509'. They simply prevent the discharge of the condenser 512 or 512' through the circuit consisting of element 507, 513, 514 or 507', 513' and 514' thus making it possible to obtain a strong transient overinjection with a relatively small value of capacitance for condenser 512 or 512'.

Once the discharge has taken place, this device no longer plays any part in the regulation of the injector. It thus has only a transient effect connected with the speed of accelerator depression. The difference between the embodiment shown in FIGS. 7 and 8 concerns the circuit action when the accelerator is again released. For the embodiment shown in FIG. 7 the device yields no transient effect, condenser 512 is recharged via diode 511, with diode 512 blocking all action on the positive base of the unijunction transistor.

However, for the case shown in FIG. 8 there is a transient diminuation of injection resulting from the device when the accelerator is released rapidly. Actually, recharging of condenser 512' via the resistance 507' and diode 509' momentarily lowers the voltage at point 508' and therefore momentarily lowers the duration of the injection, other things being equal.

Figure 9:
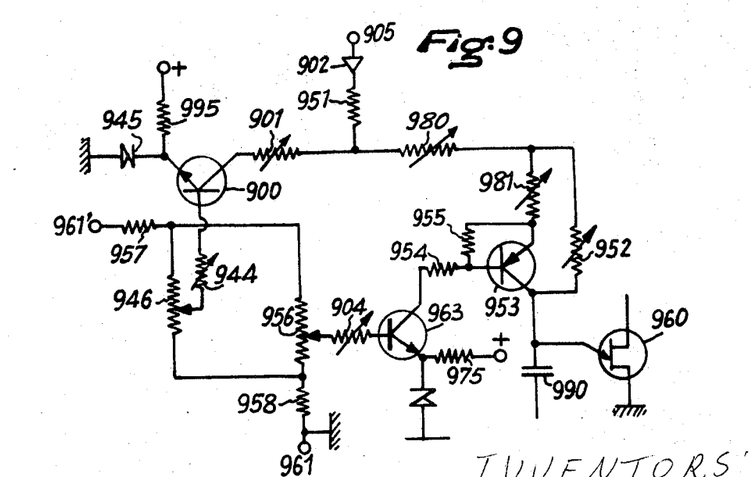
FIG. 9 is a circuit diagram showing a combination of the control arrangements according to FIGS. 3 and 4.

FIG. 9 shows a combination of the two systems described in relation to FIGS. 3 and 4.

The device here consists of transistors 953 and 963 and other elements similar to those of the circuit of FIG. 3. There has simply been added in series with the emitter of transistor 955 a variable resistance 981. This device effects the conductance of the charging circuit of condenser 990 which is connected to the emitter of unijunction transistor 960 in a manner described above in connection with FIG. 3.

Furthermore a circuit identical to that of FIG. 4 and comprising transistor 900 affects the supply voltage of the emitter circuit of unijunction transistor 960 as was explained above in connection with the device shown in FIG. 4.

Only a single voltage divider is shown in FIG. 9 which affects the circuit of transistor 900 and the combination of transistors 953 and 963 by means of the variable arms of potentiometer 946 and 956 respectively.

The combination of these two circuits leads to two opposing actions as a function of motor speed.

The circuit which contains transistor 900, identical to that shown in FIG. 4, tends to increase the injection period when the motor speed increases above a certain threshold, which action is limited of course to the motor speed which yields a voltage such that the transistor 900 is saturated.

Adjustment of potentiometer 946 allows regulation of the threshold of the regulating action.

Adjustment of the variable resistance 944 results in a regulation of the slope. Actually the base current of transistor 900 is more important for a given voltage difference between the slider potentiometer 946 and the Zener voltage of diode 945, the smaller the variable resistance.

By adjusting the variable resistance 901 one may adjust the total range of regulation between the threshold for starting the regulation and for saturation of transistor 900. Actually, below the threshold, the impedance of circuit 900 and 901 is infinite. When transistor 900 becomes saturated, this impedance is reduced to that corresponding to resistance 901. Calculations can readily show that the regulation affects the duration of the injection in a multiplicative manner and, that for a first approximation, the maximum regulation is proportional to the conductance of the resistance 901 when transistor 900 is saturated.

The circuit arrangement consisting of transistors 953 and 963 operates in the inverse direction, that is it effects the conductance of the emitter circuit of the unijunction transistor 960 in such a manner as to diminish the injection for increasing motor speeds, starting from a given threshold value. Potentiometer 956 allows adjustment of this threshold value and potentiometer 904 adjustment of the slope, that is to say the value of $dt/dN$, where $t$ is the duration of injection and $N$ is the motor speed.

Adjustment of potentiometer 981 results in regulation of the total amplitude of regulation, for the reason given above in connection with the operation of transistor 900.

Figure 10:
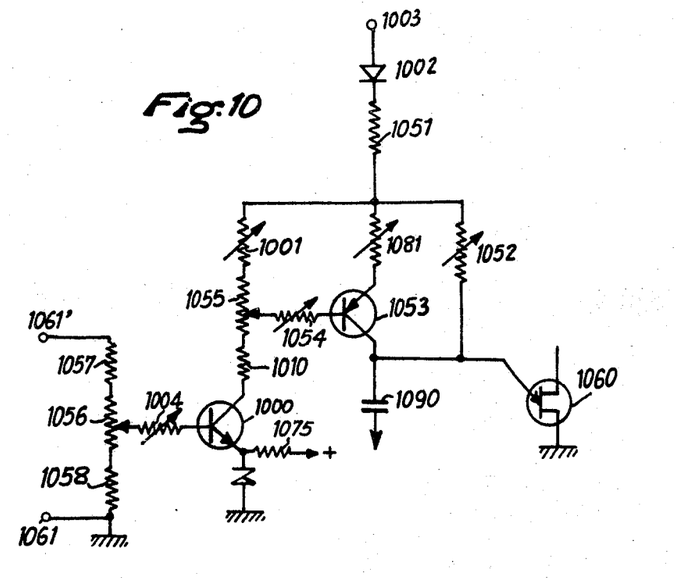
FIG. 10 is a simplified diagram of the combination according to FIG. 9.

FIG. 10 shows a grouping of the two devices which requires one less transistor.

This circuit arrangement is very close to that of FIG. 3. As was done in FIG. 9, potentiometer 1081 has been added in series with the emitter of transistor 1053, which serves the same function as transistor 953 of FIG. 9, while transistor 1000 serves the same function as transistors 900 and 963 of FIG. 9.

The operation of the circuit is as follows:

Starting with a predetermined motor speed, transistor 1000 becomes progressively more conductive as has already been explained several times above, thus causing the voltage at the common point of resistances 1052, 1081, 1001 and 1052 to decrease, which in turn tends to increase the injection time as was already explained. On the other hand transistor 1053 also becomes conductive, thus increasing the conductance of the emitter circuit of unijunction transistor 1060, which tends to decrease the injection time.

The threshold speed at which the circuit starts to operate may be adjusted by adjustment of potentiometer 1056.

The order in which the two opposing tendencies, namely an increase and a decrease in the injection time begin to take effect is determined by the position of the sliding arm of potentiometer 1055 while the total percentage of diminuation is adjusted by adjustment of resistance 1081. The overall slope is fixed by adjustment of resistance 1004, while the overall increase in regulation is adjusted by resistor 1001. The duration of the injection before the presently discussed circuit takes effect is adjusted by adjustment of resistance 1052.

Figure 11:
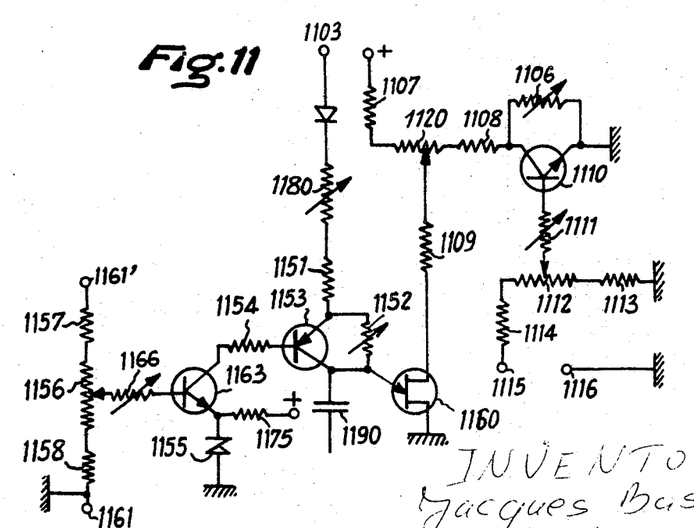
FIG. 11 is a circuit diagram of the combination of arrangements according to FIGS. 3 and 6.

FIG. 11 shows a variable delay device which uses a unijunction transistor and into whose circuits has been inserted a device according to FIG. 3 and also a circuit according to FIG. 6. A potentiometer 1120 was connected into the positive base circuit of unijunction transistor 1160 as was shown above in connection with FIG. 6. The description is the same as that given in connection with FIGS. 3 and 6. In order to facilitate the comparison the corresponding elements are designated by the same numbers as those in said figures but with a prefix 11.

Figure 12:
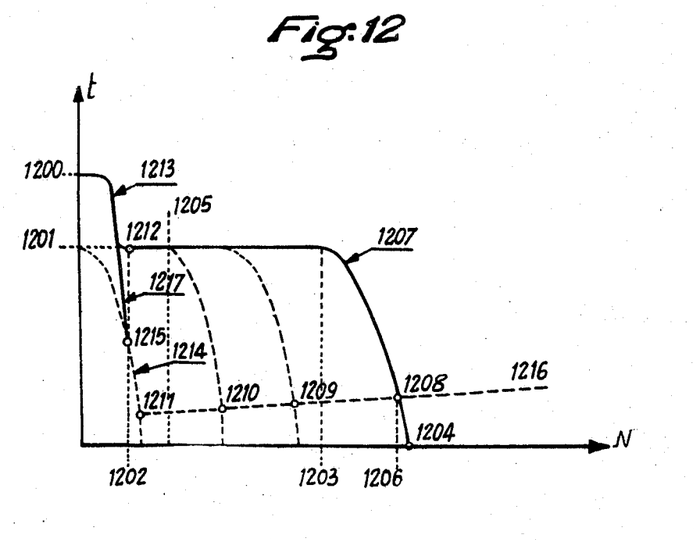
FIG. 12 is a regulation curve obtained with the arrangement according to FIG. 11.

FIG. 12 shows an example of the regulation which was obtained by use of the circuit of FIG. 11. The ordinate of the curve represents the duration of the injection time for an injector or an electromagnetic transducer, as a function of the speed of the motor, in particular for the case of regulation of a diesel motor.

First it may be assumed that the variable arm of potentiometer 1156 is connected to the accelerator. For the description it will further be assumed that this accelerator is fixed in a given position and that the motor will be started up without touching any element.

At the beginning, that is for very low speeds, transistor 1110 does not conduct. Thus the positive base of unijunction transistor 1160 is at a particular potential determined by resistances 1107, 1106 and the position of the variable arm of potentiometer 1120. Furthermore, transistor 1163 and thus transistor 1153 do not conduct. It follows that the emitter circuit of unijunction transistor 1160 which charges condenser 1190 is not effected by transistor 1153. This set of conditions corresponds to an injection duration which is shown on FIG. 12 by point 1200. Under the action of the injection, the motor, which is assumed to be uncharged, will accelerate, thus causing an increase in motor speed and as a result, an increase in the voltage applied between points 1116 and 1115 by a device such as shown in FIG. 5, for example. Thus transistor 1110 will become more and more conductive, causing a lowering of the voltage at the positive base of unijunction transistor 1160 and causing a progressive diminuation of the injection according to the segment of the curve marked 1213. When the motor speed attains a value corresponding to point 1202 in FIG. 12, for which the voltage between points 1115 and 1116 is sufficient to saturate transistor 1110, this circuit will cease to have effect (point 1212 of FIG. 12) and the injection time is stabilized at a duration corresponding to 1201.

The motor speed continues to increase until the moment at which the motor speed is sufficient to cause the firing of transistor 1163, which in turn, as explained above, causes a progressive diminuation of the injection. If the speed corresponding to the firing of transistor 1163 which is controlled by the accelerator is shown as point 1203, the cut-in point for a decrease in injection is point 1207. If curve 1216 corresponds to the no load consumption of the motor as a function of motor speed, the motor will stabilize at point 1208 corresponding to a motor speed 1206.

The percentage idling regulation of the device is defined as the change in velocity between the beginning of the regulating action and the velocity for which the injection becomes equal to zero, divided by the beginning velocity. Thus the idling regulation is defined according to FIG. 12 and the motor functioning in the corresponding condition by:

$$S\% = \frac{N_{1204} - N_{1203}}{N_{1203}} \times 100$$

If now, without charging the motor, the accelerator is released, the variable arm of potentiometer 1156 will be displaced upwards according to FIG. 11. The beginning point of regulation 1207 changes towards the left toward point 1201 for example to the intermediate position 1205. The equilibrium point of the motor will lie along line 1216 and correspond to points 1208, 1209, 1210, or 1211.

Figure 13:
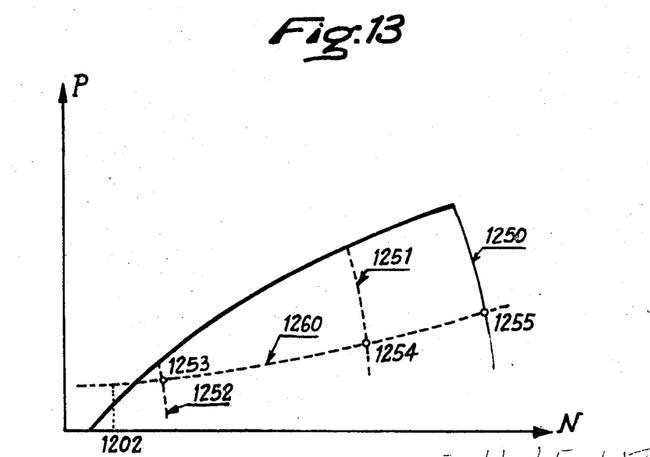
FIG. 13 is the curve of the motor power using the arrangement according to FIG. 11.

When the accelerator is completely released, regulation takes place in such a way that the velocity is stabilized for example at velocity 1211 which is a low speed. If now the motor is activated, the injection will increase automatically by the action of transistor circuit 1153 and 1163 when the motor slows up according to curve 1214 which corresponds to a completely released accelerator. If the motor reaches speed 1202 (point 1215), the low speed regulator consisting of transistor 1110 comes into action and regulatory curve 1217 is substituted for curve 1214 to avoid stalling the motor. FIG. 13 shows power as a function of speed for various positions of the accelerator (1250, 1251, 1252). If curve 1260 is a curve showing fuel charge as a function of speed, stable operation will result at points 1253, 1254, or 1255 depending on the position of the accelerator.

Without considering this invention to be limited to the combination shown at FIG. 11, it may be seen that the circuits which have been described, used either alone or in combination, allow one to obtain regulation as a function of speed which is particularly well suited for application to diesel motors. Here, without use of any input other than the accelerator, the speed of the motor is automatically taken into account by an electronic system, solely as a function of pulses which start the injection.

The regulatory characteristics may be adjusted, modified or regulated in operation as follows:
  a. Idling regulation: by action on resistance 1166;
  b. Overall multiplication of the injection duration: by activation of potentiometer 1120;
  c. Overall addition of a given interval to the injection duration: by modification of resistance 1180;
  d. Total range of the transistor action of transistors 1153 and 1163: (control of speed): by variation of resistance 1152;
  e. Total range of regulation action for low speeds (transistor 1110): by change of resistance 1106;
  f. Slope of the regulating action at low speeds regulator: by change of resistance 1111;
  g. Speed at the end of the action of the low speed regulator (transistor 1110): by activation of the potentiometer 1112; and
  h. As already mentioned, threshold, or beginning speed of the main regulator, generally connected to the accelerator: variation of potentiometer 1156.

The above is a resume of the various regulating possibilities, generally depending only on the action of the accelerator. Furthermore, as an auxiliary for starting with a cold motor, potentiometer 1120 and/or the resistance 1180 are accessible to the operator.

Figure 14:
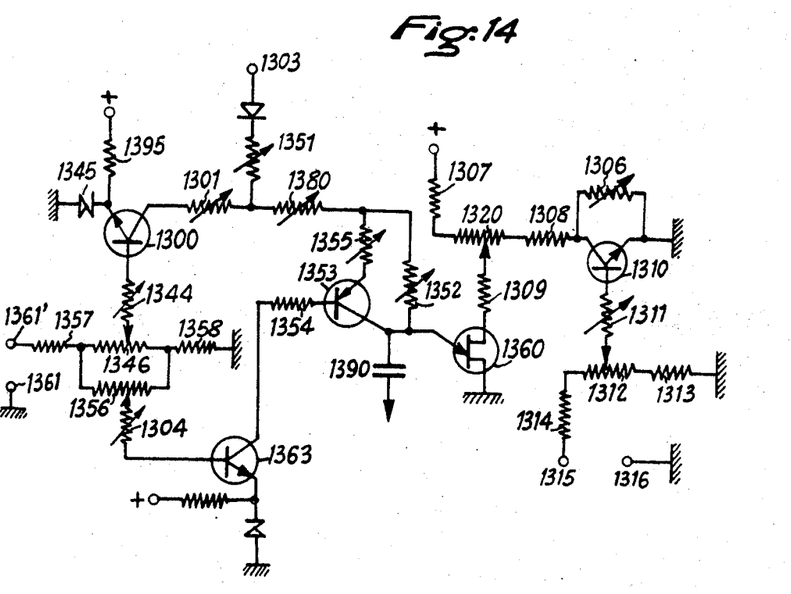
FIG. 14 is a circuit diagram showing the combination of arrangements according to FIGS. 3, 4 and 6.

FIG. 14 shows both a device for affecting the conductance of the emitter circuit of unijunction transmitter 1360, which device consists of transistors 1353 and 1363 connected as shown in the figure and explained in connection with FIG. 3; and a device which affects the voltage at the base of unijunction transistor 1360, analogous to that of FIG. 6 and consisting mainly of transistor 1310; and finally a device analogous to that of FIG. 4 which affects the supply voltage to the emitter of unijunction transistor 1360 and consists essentially of transistor 1300. Voltages which are a function of speed, obtained for example by means of a device as pictured in FIG. 5 are applied at points 1361', 1361 and 1315, and 1316.

Operation of the various circuits has been described above.

As an example of its use, let it be supposed that the circuits are used in an internal combustion engine. It will furthermore be supposed that the only mechanical input is the accelerator pedal of said motor and that the speed function is supplied to the circuit only by the pulses which start the injection and which are generated by cooperating circuits.

With only these inputs, it is possible to provide a high precision of regulation for such a motor with the above described circuits.

For purposes of this explanation it will be assumed that the device consisting of transistor 1310 is to be used for regulating at low speeds, while the other two devices are used for the regulation at higher speeds.

Figure 15:
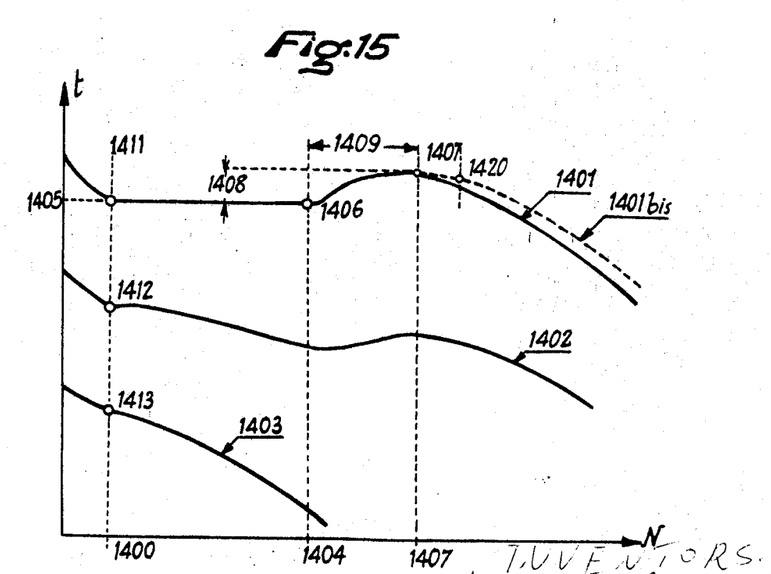
FIG. 15 is a curve showing the regulation obtained with the arrangement according to FIG. 14.

FIG. 15 shows the kind of regulation that may be obtained under these conditions. Here are shown the variation of the injected quantity of fuel (which corresponds closely to the duration of the injection), the opening of the butterfly valve, or the air intake being parameters.

In order to facilitate the understanding of this discussion only three regulating curves have been presented. Curve 1401 corresponds to a large opening of the butterfly valve, curve 1403 to a small opening, and 1402 to an intermediate opening of said valve.

It will be assumed that for the speed corresponding to point 1400, namely the low speed, the action of the low speed regulator will terminate by saturation of transistor 1310 and that the other devices will not as yet have entered into operation. The corresponding duration of injection, represented by points 1411, 1412 or 1413 are regulated by resistances 1380 and/or 1352 which are connected directly to the accelerator or connected by means of a cam of an appropriate configuration to reproduce the desired quantity of injection as a function of accelerator position for this speed. If the motor slows up to below this motor speed, the low speed regulator, consisting essentially of transistor 1310, will become activated and will automatically augment the injection period according to the part of curves 1401, 1402 or 1403 situated at the extreme left. It will be immediately noted that:

a. The total percentage of the action of the low speed regulator may be adjusted by resistance 1306;
b. the motor speed 1400 below which this low speed regulator enters into operation, may be regulated by potentiometer 1312; and
c. the slope of the action ($dt/dN$) may be regulated by resistance 1311.

It will also be noted that these control elements 1306, 1312, and 1311 may also be connected either directly or by cam to the accelerator, in such a manner that, for each value of butterfly valve opening, it is possible to obtain the desired shape of the left portion of the curve easily and automatically. For example speed 1400 may be completely different corresponding to the various openings.

Generally, these magnitudes are regulated simply by the equipment of the vehicle.

Now curve 1401 (corresponding to a large opening of the butterfly valve) will be considered in more detail, starting with speed 1400. Generally speaking the fuel supply of the motor is first determined as a function of motor speed. For example, this may take place between the speeds 1400 and 1404. One has then regulated transistors 1353 and 1363 on the one hand and transistor 1300 on the other hand in such a manner that they do not become activated below the speed corresponding to point 1404. Thus the basic injection does not vary any more. Starting with speed 1404 for example because of aerodynamic phenomena and due to an effect of turbulence in the piping, the quantity of air entering into the cylinder increases until the speed corresponding to point 1407. It is thus sufficient to control potentiometer 1346 in such a manner that at 1404 a transistor 1300 becomes conductive. The total increase of amplitude (represented by segment 1408) will be regulated by resistance 1301.

The total increase in amplitude (shown by segment 1408) is regulated by resistance 1301, while the speed is regulated by resistance 1344 which allows determination of point 1407 not only by the desired change in motor speed which is represented by segment 1409 to correspond to a change of injection time represented by segment 1408, but also with a controlled slope due to the adjustment of variable resistance 1301.

If, starting from a motor speed corresponding to point 1407 the air intake is decreased, one can then regulate potentiometer 1356 in such a manner that the regulating device represented here by transistors 1353 and 1363 will operate in accordance with the changed conditions. The slope of the curve may be regulated by resistance 1304, but the variation of resistance 1304 does not control the slope on the part of the curve to the right of point 1401 (high motor speeds). Actually, it is sufficient to have adjusted resistances 1344, 1301 and potentiometer 1346 in such a manner that at point 1407 transistor 1300 is not yet saturated, thus enabling one to vary the slope of the curve by means of transistor 1300 on the one hand and by means of transistors 1353 and 1363 on the other hand until transistor 1300 becomes saturated.

For example, an alternate to curve 1401, namely curve 1401 with the dashed lines, shows a regulation for which between points 1407 and 1420 there is a new plateau before a decrease in the fuel supply. It is thus sufficient to adjust the circuit in such a manner that the regulating circuit shown as transistors 1353 and 1363 does not control the action until point 1420, transistor 1300 having been saturated at point 1407 by suitable adjustment of resistance 1344 and potentiometer 1346.

To summarize, it is possible to control the plateau from point 1411 to 1406, the change in injection amplitude 1408, the change in speed represented by segment 1409, the slope at point 1407, and the total amplitude as well as the slope starting with point 1407 (or 1420) for that part of the curve which is to the right of speed 1407.

It is obvious that the various regulating elements may be activated under control of the butterfly valve and that thus many different circuit configurations may be obtained for different valve openings. Thus curve 1402 is a curve with a much shorter plateau, with less pronounced wave effects at another velocity and wherein the decrease in the injection starts at a relatively low motor speed.

Curve 1403 shows a regulation curve for a very small opening of the butterfly valve wherein the wave effect has practically disappeared and wherein the decrease in injection appears almost immediately.

Such curves may be obtained automatically with only one circuit such as shown in FIG. 14. It is obvious, that in practice that it is not necessary or desirable to vary all these parameters.

Generally speaking only the resistances 1301, 1380, and 1355, and the potentiometer 1356 are connected to the butterfly valve.

It is furthermore also evident that for a particular case it is possible to utilize not only all the parameters which are available by the circuit shown in FIG. 13, but to multiply the possible effects by use, for example, of a plurality of circuits such as those described in connection with FIGS. 1, 3, 4 and 6 or to use the multiplicative effects which may be obtained by potentiometer 1320 or the additive effects by resistance 1351.

Figure 16:
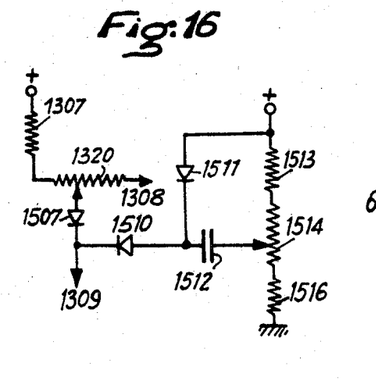
FIG. 16 is a circuit diagram showing the combination of arrangements according to FIGS. 6 and 7.

FIG. 16 shows a circuit similar to that of FIG. 14, which has not been repeated here, but in which has been inserted a circuit analogous to that of FIG. 7. Those elements which are shown in FIG. 13 have the same numbers as in FIG. 7 but are preceded by the number 15.

The functioning of this circuit has been explained above. The variable arm of potentiometer 1514 is connected to the accelerator.

Figure 17:
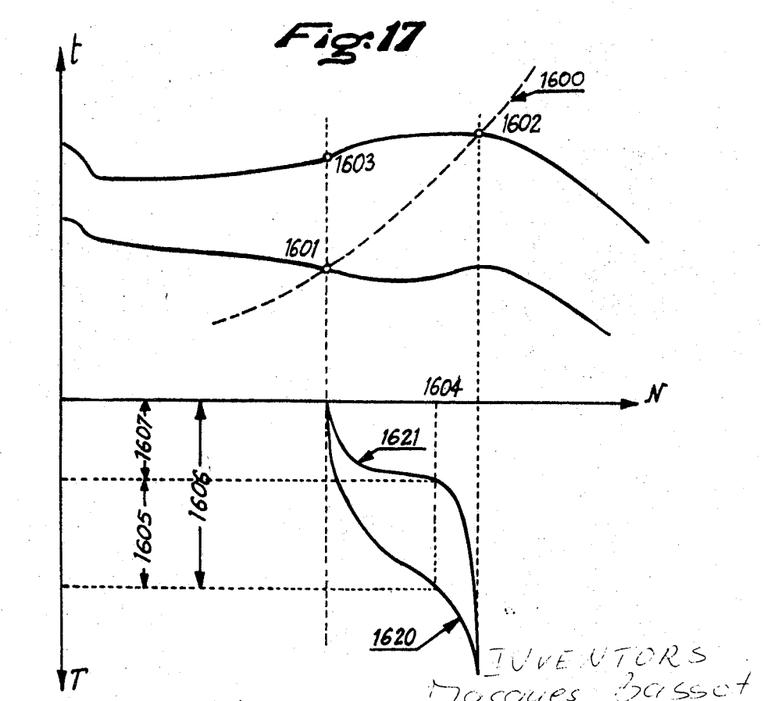
FIG. 17 is a curve showing the regulation obtained with the arrangement according to FIG. 16.

FIG. 17 shows curve 1601 and 1602 which correspond to curves 1401 and 1402 of FIG. 14. A curve of fuel charge as a function of motor speed has been added and numbered 1600.

An equilibrium point is represented at 1601, under given conditions. For a rapid acceleration which results in complete opening of the butterfly valve the equilibrium point may pass to point 1602. This type of action occurs if no device for temporary enrichment of the mixture such as that shown in FIG. 15 is present. In this case a curve of motor speed plotted against time is shown as 1620. If a circuit such as that shown in FIG. 16 is present which gives a temporary enrichment of the mixture, then a characteristic motor speed-time period such as that of curve 1621 results. Thus, in order to effect a speed change of the motor from the starting speed to a speed close to the final velocity, the time gains will be represented by segment 1605 which is equal to the difference in acceleration time without the temporary enrichment circuit, 1606, or to the acceleration time when this circuit is present, namely time 1607. As is well known, polycylindric motors are generally equipped with a single air-intake from which the air is distributed to the several cylinders, from a single butterfly valve which is generally preceded by a single air filter. This arrangement is usually used for reasons of economy especially since using a butterfly valve and a filter for each cylinder will often result in dissymmetry in the air intake for the various cylinders even if proper care is taken in mounting the valves. Furthermore, for obvious economic reasons, it is not practical to furnish a specially adapted injector for each cylinder, but identical injectors are used throughout. Furthermore, it is hardly possible for the same reasons to furnish a separate electronic computing element for each cylinder.

In spite of the rather small dissymmetry between the different cylinders it may be of interest, particularly in the regions close to low speeds to be able to vary the injection slightly from one cylinder to the next, while using identical injectors and only one control circuit.

Another possibility is particularly advantageous in order to insure the least possible air-pollution independently for each cylinder by changing the richness of the mixture for the various cylinders individually at low speeds.

Thus even better values may be obtained than those using optimum average regulation.

In order to obtain such a result, it is necessary in practice to be able to have multiplicative or additive and subtractive corrections which change from one cylinder to the other.

Figure 18:
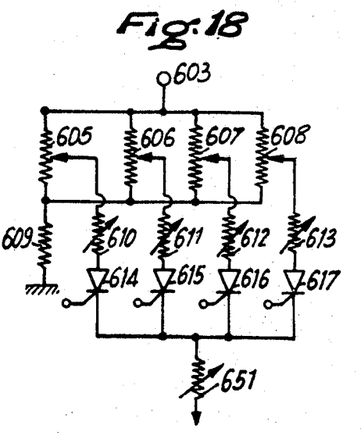
FIG. 18 is a circuit diagram of an arrangement allowing independent regulation of the various injectors connected into the charging circuit of the condenser of the variable delay device.

FIG. 18 shows a circuit which allows these small modifications. The circuit is inserted between the bistable element which is not shown and the variable delay device into the emitter circuit of the unijunction transistor which is not shown either. All these circuits which were discussed above and/or others may be in the emitter circuit. Resistance 651 shows the input to this circuit and is analogous to resistances 51 of other circuits, for example 1351 of FIG. 14. As was discussed above in connection with FIG. 1, the potential at point 603 assumes substantially the potential of the power supply at the beginning of the injection. The circuit thus consists of a given number of parallel potentiometers, here, for the case of a four-cylinder-motor, the potentiometers 605, 606, 607 and 608. Each of these potentiometers has one fixed terminal connected to point 603, while the other fixed terminal is connected to the negative terminal of the power supply via a resistance 609. A circuit consisting of adjustable resistances 610—613 and low power thyristors here designated 614—617 is connected to the variable arm of each of the potentiometers 605—608. The anode of the thyristor in each case is connected to the variable resistance while all the cathodes are jointly connected to resistance 651.

The operation of the circuit is as follows: at the time an injection is started on a given injector, the same injection start pulse is used, by means of a distributor which is the same or identical to the injection pulse distributor, to fire one of the thyristors 614—617. Each thyristor corresponds to a particular injector. The variable delay device, or more exactly the emitter of the unijunction transistor of the variable delay device, is energized from point 603 via one of the circuits consisting of elements 605, 610, 614; or 606, 611, 615; or 607, 612, 616; or 608, 613, 617. It can easily be shown that activation of one of the potentiometers 605—608 has a multiplicative effect on the duration of the injection of the corresponding injector, all other things being equal, and that variation of resistances 610—613 has an additive effect.

Of course it is not necessary to have as many individual correction circuits as there are injectors even for a motor having an unsymmetrical distribution. For example the same circuit may be connected to a plurality of injectors corresponding to cylinders which are furnished with air in an identical fashion.

We claim:

1. In a fuel injection system for internal combustion engines having injection means for injecting fuel into said internal combustion engines, bistable control means for generating signals for controlling the period of injection of said injection means, and variable delay means for generating an end of injection signal, said bistable control means adapted to switch from a first state to a second state upon receipt of an injection start signal in synchronism with engine rotation and to generate an injection signal to said injection means, and also adapted to switch back to said first state upon receipt of said end of injection signal from said variable delay means; said variable delay means comprising:

a. transistor switching means having at least a first and second terminal;
   b. a capacitor connected to said first terminal and connected to charge to a certain voltage as function of engine functioning parameters;
   c. means for starting the charging of said capacitor in synchronism with said injection start signal;
   d. means for applying a speed voltage, which varies as a function of motor speeds, to said capacitor to vary the charging current of said capacitor as a function of motor speed, said means comprising a charging transistor whose base-emitter voltage is a function of said motor speed voltage and whose collector-emitter circuit controls at least a part of said charging current; and
   e. said transistor switching means cooperating with said capacitor to provide for discharge of said capacitor upon said capacitor reaching a predetermined voltage in relation to the voltage at said second terminal, the discharge of said capacitor producing said end of injection signal.

2. A system as set forth in claim 1, wherein said transistor switching means comprises a unijunction transistor having an emitter, the terminal for said emitter constituting said first terminal; a base, the terminal for said base constituting said second terminal; and adapted to switch to the conducting state after said capacitor has attained said predetermined voltage relationship to said base voltage.

3. A system as set forth in claim 1, wherein said transistor switching means comprises a unijunction transistor having a first and second unijunction base, and an emitter, adapted to generate said end of injection signal when the voltage at one of said bases reaches a predetermined relationship to the voltage at said emitter; wherein said means for applying said motor speed voltage to said capacitor comprises variable impedance means connected in parallel to said unijunction transistor bases; a power supply; a common impedance connected between said parallel circuits and said power supply; and means for changing the impedance of said variable impedance means as a function of said speed voltage thus causing variations of base voltage of said unijunction transistor, and changing the injection duration.

4. A system as set forth in claim 2, also comprising circuit means for temporarily increasing the injection period as a function of accelerator depression.

5. A system as set forth in claim 1, wherein said bistable control means comprises a bistable multivibrator circuit.

6. A system as set forth in claim 2, also comprising a charging resistance in parallel with said collector-emitter circuit of said charging transistor, in order to permit charging of said capacitor before said transistor becomes conductive.

7. A system as set forth in claim 6, also comprising a voltage divider having a variable arm and connected across said generator for generating said speed voltage in such a manner as to furnish a portion of said speed voltage at said variable arm.

8. A system as set forth in claim 7, also comprising a power supply having a positive and a negative terminal; a second transistor having a second base connected to the variable arm of said voltage divider, a second emitter connected to ground by means of a Zener diode, and to said positive power supply terminal by means of a resistance, and a second collector connected to the base of said charging transistor by means of an additional resistance; a feedback resistance connected from the emitter to the base of said charging transistor; the Zener voltage of said diode thus determining the threshhold of the regulating action of said two transistors.

9. A system as set forth in claim 1, wherein said means for applying said speed voltage to said capacitor comprises a voltage regulating transistor having a regulating base and a regulating emitter-collector circuit; wherein said regulating base is connected to said speed voltage generating means; and wherein said collector-emitter circuit is connected in parallel to said capacitor; also comprising a common impedance connected from said parallel combination to said power supply; a change in conductance of said collector-emitter circuit thus causing a change of voltage applied to said capacitor by changing the voltage drop across said common impedance.

10. A system as set forth in claim 9, also comprising a Zener diode connected from said regulating emitter to ground and a control resistance connected from said regulating emitter to said positive power supply terminal.

11. A system as set forth in claim 8, also comprising a voltage regulating transistor having a regulating base and a regulating emitter-collector circuit; wherein said regulating base is connected to said speed voltage generating means; and wherein said regulating collector-emitter circuit is connected in parallel to said capacitor; also comprising a common impedance connected from said parallel combination to said power supply; a change in conductance of said collector-emitter circuit thus causing a change of voltage applied to said capacitor by changing the voltage drop across said common impedance.

12. A system as set forth in claim 8, also comprising a first variable resistance connected in series with the emitter of said charging transistor; a second variable resistance connected in series with said second base; a potentiometer having a wiper arm connected between said emitter of said charging transistor and second collector, said wiper being connected to said base of said charging transistor; and a third variable resistance connected between said wiper arm and said base.

13. A system as set forth in claim 3, wherein said variable impedance means comprise the collector-emitter circuit of a third transistor; and wherein said means for varying said impedance comprise a third voltage divider having a variable arm said speed voltage being applied to said third voltage divider; and a variable resistance connected between said variable arm of said voltage divider and the base of said transistor.

14. A system as set forth in claim 13, also comprising a capacitor in the base circuit of said unijunction transistor; and means for varying the charging current of said capacitor as a function of said motor speed, said injection time period thus depending on the relationship between said voltage at the base of said unijunction transistor and the voltage at the emitter of said unijunction transistor, each of which is a function of said motor speed.

15. A system as set forth in claim 13, wherein said motor has an accelerator; also comprising variable resistance means having a wiper arm connected to said accelerator and adapted to change said injection time as a function of position of said accelerator.

16. A system as set forth in claim 15, wherein said variable resistance means is connected across the collector-emitter circuit of said third transistor.

17. A system as set forth in claim 15, said variable resistance means being connected in the base circuit of said third transistor, and thus adapted to change said determined time period as a function of the position of said accelerator.

18. A system as set forth in claim 13, wherein said unijunction base voltage regulating circuit is used for regulation at low motor speeds; also comprising circuit means adapted to increase said injection period with increasing motor speed, said circuit means being adapted to become activated at a predetermined speed higher than the range of speed accommodated by said unijunction base voltage regulating device; and further circuit means adapted to decrease said fuel injection period as a function of motor speed at a speed range higher than that for which said second circuit means are activated.

19. A system as set forth in claim 1, for a polycylindric motor also comprising a plurality of variable resistors one for each injector of said injection means and means for inserting the corresponding resistor into the charging circuit of said capacitor upon activation of the corresponding injector, thus permitting individual adjustment of injection time for each of said injectors.

20. A system as set forth in claim 19, wherein said means for inserting said corresponding variable resistance into the charging circuit of said capacitor comprise a plurality of thyristors one for each of said variable resistors, said thyristors being adapted to be activated simultaneously with said injectors.

21. A system as set forth in claim 4, wherein said means for transient increase of the injection period comprise a potentiometer having a variable arm connected to the accelerator; a capacitor connected between said variable arm and said positive base of said unijunction transistor; and a resistance-diode circuit adapted to connect said positive base of said unijunction transistor to said positive supply terminal; depression of the accelerator terminal causing said capacitor to assume an increased positive value thus increasing said positive base potential and increasing the duration of injection.

22. In a fuel injection system for internal combustion engines having injection means for injecting fuel into said internal combustion engines, bistable multivibrator circuit means for generating signals for controlling the period of injection of said injection means, and variable delay means for generating an end of injection signal, said bistable control means adapted to switch from a first state to a second state upon receipt of an injection start signal in synchronism with engine rotation and to generate an injection signal to said injection means, and also adapted to switch back to said first state upon receipt of said end of injection signal from said variable delay means, said signals having a leading edge and a trailing edge; a circuit for generating a voltage which is a function of the speed of said motor, comprising in combination, pulse transformer means connected to the source of said injector pulses, said pulse transformer means thus being adapted to furnish opposite polarity pulses for the leading edge and trailing edge of said injector pulses; rectifier means adapted to receive said pulse transformer furnished pulses and furnish rectified pulses of one polarity only; capacitor means adapted to be charged by said rectified pulses, and means for partially discharging said capacitor during the time period between pulses, whereby the average voltage on said capacitor constitutes a measure of the pulse repetition rate, and thus of the motor speed.

23. A system as set forth in claim 22, wherein said pulse transformer is connected to the collector of a transistor of the bistable multivibrator circuit in whose emitter-collector circuit current flows in the duration of said injector pulses; also comprising unidirectional conducting means connected from said collector to ground in order to prevent damage to said transistor.

24. A system as set forth in claim 22, wherein said rectifier means comprise a full-wave rectifier interconnected between said pulse transformer and said capacitive means in order that said capacitor will be charged both by said pulse resulting from said leading edge and the pulse resulting from said trailing edge.

25. A system as set forth in claim 22 also comprising a resistance interconnected between said capacitive means and said full-wave rectifier in order to permit discharge of said capacitive means in the interpulse interval.

PO-1050
(5/69)

UNITED STATES PATENT OFFICE
CERTIFICATE OF CORRECTION

Patent No. 3,526,212           Dated   September 29, 1970

Inventor(s)   Jacques Bassot and Louis Monpetit

It is certified that error appears in the above-identified patent and that said Letters Patent are hereby corrected as shown below:

On the front page of the patent add the following:

Claim of Priority:

[31] PV 89,547

[32] December 30, 1966

[33] France

SIGNED AND
SEALED
NOV 24 1970

(SEAL)
Attest:

Edward M. Fletcher, Jr.
Attesting Officer

WILLIAM E. SCHUYLER, JR.
Commissioner of Patents